Jan. 1, 1952      A. A. ROUSE      2,580,601
DEGREE LEVEL
Filed Aug. 18, 1950
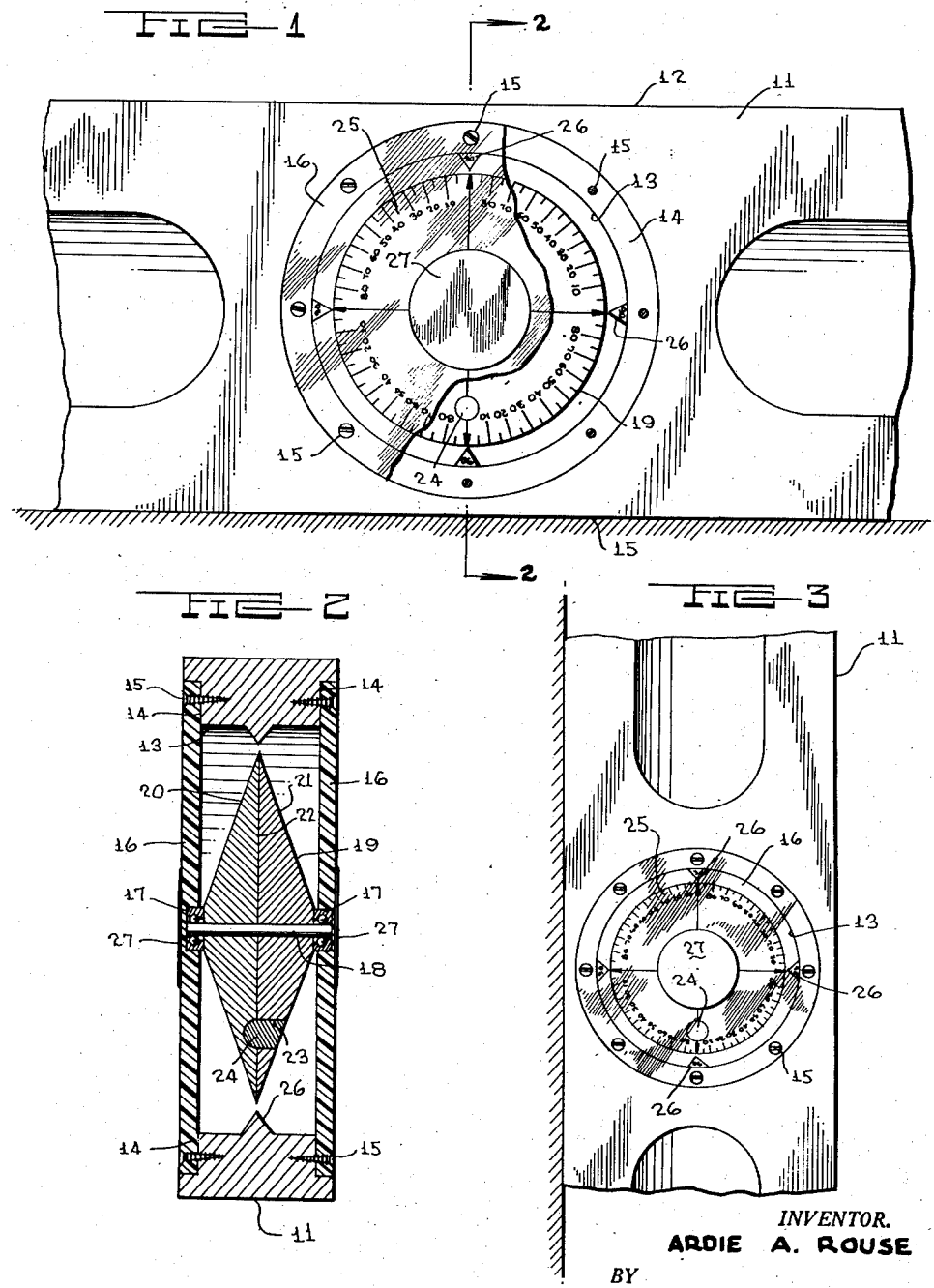
INVENTOR.
ARDIE A. ROUSE
BY Patented Jan. 1, 1952

2,580,601

UNITED STATES PATENT OFFICE 2,580,601

DEGREE LEVEL

Ardie A. Rouse, Orange, Tex.

Application August 18, 1950, Serial No. 180,249

1 Claim. (Cl. 33—215)

This invention relates to geometrical instruments, and more particularly to an artisan's level.

A main object of the invention is to provide a novel and improved artisan's level which is simple in construction, which provides a very accurate reading, and which does not involve the use of liquids therein.

A further object of the invention is to provide an improved artisan's level which is inexpensive to manufacture, which is sturdy in construction, which retains its accuracy over a long period of time, which is easy to read, and which is positive in action.

Further objects and advantages of the invention will become apparent from the following description and claim, and from the accompanying drawings, wherein:

Figure 1 is a fragmentary side elevational view of a portion of an improved artisan's level constructed in accordance with the present invention, showing the indicating means provided on the level;

Figure 2 is a cross-sectional detail view taken on line 2—2 of Figure 1;

Figure 3 is a fragmentary elevational view similar to Figure 1, but showing the level in a vertical position.

Referring to the drawings, the level comprises a straight bar member 11 having parallel, longitudinal opposite edges 12, 12 and being formed with a circular opening 13 which is recessed around its periphery on the opposite sides of the bar 11, as shown at 14, 14. Secured in the annular recesses 14, 14, as by screws 15, are the respective transparent plastic windows 16, 16. Journaled axially in the windows, as by the bearings 17, 17, is a transverse shaft 18 on which is secured a disc member 19. The disc member 19 comprises the opposed, conical segments 20, 21, of plastic or the like, cemented together at 22 to define a unitary disc structure. Said disc structure is recessed, as shown at 23, adjacent its periphery and contains a mass 24 of lead or other suitable heavy material. The opposite sides of the disc 19 are inscribed adjacent the periphery of the disc with the degree scales 25, each side of the disc being inscribed with four 90-degree scales, as shown in Figures 1 and 3, each 90-degree scale occupying one quadrant of the disc peripheral surface. The inside wall surface of the opening 13 is formed at 90-degree intervals with tapered, inwardly directed projections 26 serving as pointers with reference to the degree scale 25. When the surface on which the level is placed is horizontal, as shown for example in Figure 1, the weight 24 biases the disc 19 to a position wherein each pointer 26 is located opposite a zero mark on one of the scales 25. When the level is placed against a vertical surface, as shown in Figure 3, the disc member 19 rotates 90° and the pointer elements 26 indicate this fact with respect to the aforementioned scale 25. Intermediate angular positions of the level bar 11 will, of course, be indicated on the scales 25 by the pointer element 26.

Disposed over the central portions of the outside surfaces of the windows 16, 16 are the opaque, plastic layers 27, 27 which obscure the bearings 17, 17 and limit visibility so that only the outer portions of the disc surfaces may be observed. This reduces the possibility of confusion in reading the level device.

While a specific embodiment of an improved artisan's level has been disclosed in the foregoing description, it will be understood that numerous modifications within the spirit of the invention may occur to those skilled in the art. Therefore, it is intended that no limitations be placed on the invention except as defined by the scope of the appended claim.

What is claimed is:

An artisan's level comprising an elongated bar having straight parallel opposite longitudinal edges, said bar being transversely formed with a circular opening, the opposite sides of the bar being formed with annular recesses concentric to said opening, respective transparent windows secured in said recesses on the opposite sides of said bar flush with the sides of and covering said opening, the centers of the windows being formed at their insides with recesses, respective ball bearings mounted in said last named recesses, a transverse shaft journaled in said ball bearings, a solid, double conical disc secured at its center on said shaft for rotative movement between said windows, said disc being closely adjacent to and substantially covering said ball bearings at the respective opposite apices of the disc, whereby said bearings are protected against the entry of dust, both sides of said disc being inscribed with degree markings at its periphery, a plurality of pointer elements carried by the inside wall of said opening extending adjacent said periphery, said elements being in 90° spaced relationship, and a biasing weight secured in said disc adjacent its periphery.

ARDIE A. ROUSE.

REFERENCES CITED

The following references are of record in the file of this patent:

UNITED STATES PATENTS

| Number | Name | Date |
|---|---|---|
| 540,188 | Proctor | May 28, 1895 |
| 892,468 | Unger | July 7, 1908 |
| 1,141,315 | Caughron | June 1, 1915 |
| 1,373,336 | Knapp | Mar. 29, 1921 |
| 1,814,976 | Stromer | July 14, 1931 |
| 1,844,590 | Morrison | Feb. 9, 1932 |